US005516843A

United States Patent [19]

Scholl

[11] Patent Number: 5,516,843
[45] Date of Patent: May 14, 1996

[54] ADHESION PROMOTER COMPOSITION AND PRODUCTS

[75] Inventor: Steven L. Scholl, Cottage Grove, Minn.

[73] Assignee: Fiber Resin Corp., St. Paul, Minn.

[21] Appl. No.: 251,714

[22] Filed: May 31, 1994

[51] Int. Cl.⁶ .............................. C08L 61/10; C08L 23/28
[52] U.S. Cl. ...................... 525/134; 525/144; 525/151; 525/326.1
[58] Field of Search ...................................... 525/158, 134, 525/144, 151, 326.1

[56] References Cited

U.S. PATENT DOCUMENTS

| | | | |
|---|---|---|---|
| 3,297,473 | 1/1967 | Bulbenko . | |
| 3,317,461 | 5/1967 | Pleuddemann | 260/46.5 |
| 3,856,740 | 12/1974 | Takahashi et al. | 260/33.6 AQ |
| 4,000,347 | 12/1976 | Ranney et al. | 428/419 |
| 4,020,218 | 4/1977 | Ranney et al. | 428/447 |
| 4,371,476 | 2/1983 | Newkirk et al. | 260/709 |
| 4,376,171 | 3/1983 | Blount | 521/100 |
| 4,558,089 | 10/1985 | Koyama et al. | 524/509 |
| 4,607,078 | 8/1986 | Dergazarian | 525/64 |
| 4,752,415 | 6/1988 | Iwaskow et al. | 252/511 |
| 4,882,089 | 11/1989 | Iwaskow et al. | 428/242 |
| 4,983,456 | 1/1991 | Iwaskow et al. | 428/254 |
| 5,008,135 | 4/1991 | Giordano et al. | 427/386 |
| 5,385,979 | 1/1995 | Ozawa et al. | 525/145 |

OTHER PUBLICATIONS

Durez Resins & Molding Materials, Tonawanda, NY, brochure entitled "Durez Phenolic Resins for The Rubber Industry".
Eastman Kodak Co., Material Safety Data Sheet for "Eastman" Chlorinated Polyolefin 343–1.
S. M. Ellerstein et al., *Kirk Othmer Concise Encyclopedia of Chemical Technology*, 18, 814 (1982).
B. C. Ennis et al., *J. Appl. Polymer Sci.*, 41, 2837–2854 (1990).
Occidental Chemical Corporation, Data Sheet #1104, "Durez Phenolic Resin".

*Primary Examiner*—W. Robinson Clark
*Attorney, Agent, or Firm*—Mueting, Raasch, Gebhardt & Schwappach

[57] ABSTRACT

An adhesion promoter composition and method for enhancing adhesion between a polysulfide polymer and a thermoplastic substrate is provided having a solid resole phenolic resin and a compatible organic solvent, optionally containing a chlorinated polyolefin.

20 Claims, 1 Drawing Sheet

ADHESION PROMOTER COMPOSITION AND PRODUCTS

FIELD OF THE INVENTION

The present invention relates to adhesion promoter compositions for enhancing the bonding of polysulfide sealants to a variety of polymeric substrates, and products containing such promoters.

BACKGROUND OF THE INVENTION

Sealants are typically synthetic resins that are soft enough to pour or extrude and readily harden or solidify to form a permanent bond with the substrate on which it is coated. They are generally used to exclude dust, dirt, moisture, gases, and chemicals. They can also be used to reduce noise and vibrations, and even to insulate. As used herein, caulks are included within the meaning of the term sealant.

One type of commercially available sealant is made of polysulfide polymers. See, for example, U.S. Pat. No. 3,297,473 (Bulbenko, issued Jan. 10, 1967) and U.S. Pat. No. 3,317,461 (Pleuddemann, issued May 2, 1967). Typically, the polysulfide polymers in sealants are thiol-terminated liquids that are convertible to the solid state. Such liquid polysulfides are available under the trade name LP by Morton Thiokol Corporation.

Polysulfide sealants do not effectively adhere to inorganic or organic surfaces. For example, under conditions of high moisture they do not adhere effectively to inorganic surfaces, such as glass, ceramic, concrete, or metal surfaces. Thus, adhesion promoters are typically used to enhance the strength of the adherence or bonding of the sealant to the surface. For example, phenolic-based adhesion promoters are used to enhance adhesion of polysulfide sealants to metals, whereas silane-based adhesion promoters are used to enhance adhesion to glass. There is need, however, for an adhesion promoter to enhance adhesion of polysulfide sealants to organic polymers such as nylon, polypropylene, and polyvinyl chloride, for example.

The petroleum and construction industries coat steel with nylon to inhibit corrosion of the steel. Furthermore, structural components, such as wood or steel beams, will be replaced more by polypropylene or nylon beams. The automotive industry use polypropylene and/or nylon to coat parts, such as bumpers, or to replace steel gas tanks, for example, as a weight saving advantage. The current polysulfide sealants actually contain phenolic-based adhesion promoters; however, these do not adhere well to such substrates. That is, the adhesion and cohesion such sealants exhibit are not generally acceptable to the end user for adhesion to nylon and polypropylene.

Silane coupling agents, such as those produced by Union Carbide under the trade designations A-189, Y-9194, and A-1120, and monoalkoxy titanate coupling agents, such as that produced by Kenrich (Bayonne, N.J.) under the trade designation KRTTS, have been suggested to enhance polysulfide sealant adhesion to glass, metal, and even plastics. Unfortunately, however, these adhesion promoters do not function with 100% cohesive failure of the sealant to the substrate. That is, the bond between the sealant and the substrate fails before the sealant itself fails internally. Thus, there is need for an adhesion promoter that enhances the adhesion between polysulfide sealants and organic polymers, particularly for adhesion promoters that function with 100% cohesive failure of a polysulfide sealant to an organic polymer, such as nylon, polyvinyl chloride, and polypropylene.

SUMMARY OF THE INVENTION

The present invention provides adhesion promoter compositions. Advantageously, the compositions of the present invention can enhance the adhesion between a polysulfide sealant and a solid thermoplastic substrate, such as nylon, polyvinyl chloride, or polypropylene. The present invention also provides methods of promoting adhesion of a polysulfide sealant to a thermoplastic substrate, and the resultant polysulfide-coated substrates.

The compositions of the present invention include compatible mixtures of a solid resole phenolic resin and a polar organic solvent. In certain preferred embodiments, the compositions contain a compatible chlorinated polyolefin. As used herein, "compatible" means that each component of the composition is sufficiently dispersed in, preferably sufficiently soluble in, the other components such that each component remains in dispersion without substantial separation or precipitation, e.g., without bloom. More preferably, the adhesion compositions of the present invention include a solid resole phenol-formaldehyde resin, a chlorinated polyolefin, and an alcohol or ketone.

DETAILED DESCRIPTION OF THE INVENTION

Figure 1:
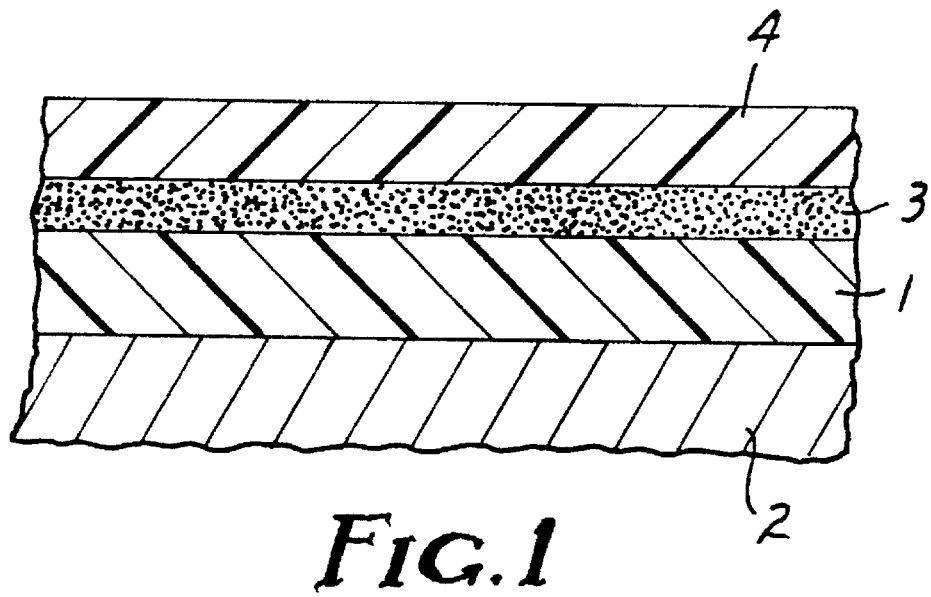
FIG. 1 is a cross-sectional view of an embodiment of a thermoplastic polymeric substrate having coated thereon an adhesion promoter composition and a polysulfide polymer.

The present invention provides adhesion promoter compositions for improving the adherence of polysulfides, e.g., polysulfide sealants, to the surfaces of solid thermoplastic substrate. The adhesion promoter compositions of the present invention are applied to the substrate and the polysulfide is applied over the adhesion promoter. In this manner, such compositions provide better adherence of a polysulfide to a thermoplastic substrate surface than if the polysulfide is directly applied to the thermoplastic surface. Furthermore, such compositions provide better adhesion between a polysulfide and a thermoplastic substrate when applied in this manner than if the adhesion promoter is combined with, i.e., incorporated into, the polysulfide composition.

Preferably, the adhesion promoter compositions of the present invention provide sufficient adhesion of polysulfides to solid thermoplastic substrates that the layer of polysulfide itself fails internally before the bond between the substrate and the polysulfide fails. This is referred to herein as "failing cohesively to the substrate" or as "100% cohesive failure." Thus, there is excellent adhesion between the substrate and the polysulfide that is acceptable for many applications.

The adhesion promoter compositions contain compatible mixtures of a solid resole phenolic resin, a chlorinated polyolefin, or both, and a polar organic solvent. Depending on the type of polymer to which the polysulfide is to be adhered, and upon the level of improved adhesion desired, a different composition is used. As a general rule, for thermoplastic substrates having a relatively high surface tension, a solid resole phenolic resin is sufficient for 100% cohesive failure. For those substrates having a relatively low surface tension, a solid resole phenolic resin and a polyolefin must be used in combination for 100% cohesive failure. That is, for thermoplastics having a surface tension of at least 35 dynes/cm$^2$ a solid resole phenolic resin can be used as the adhesion promoter, whereas for thermoplastics having a surface tension of less than 35 dynes/cm$^2$ a combination of a resole phenolic resin and a polyolefin is used as the adhesion promoter.

For example, a solid resole phenolic resin can be used with thermoplastic substrates such as nylon (surface tension=46 dynes/cm$^2$), polyvinyl chloride (surface tension=39 dynes/cm$^2$), polycarbonate (surface tension=45 dynes/cm$^2$), and acrylic (surface tension=40 dynes/cm$^2$) for 100% cohesive failure. Solid resole phenolic resins used alone (i.e., without a polyolefin), however, do not provide significantly improved adhesion of polysulfides to polyolefin substrates such as polypropylene and polyethylene (surface tension= 20–30 dynes/cm$^2$), although there is improvement in the adhesion relative to the absence of a distinct layer of a solid resole phenolic resin. A chlorinated polyolefin, however, does provide improvement in adhesion of polysulfides to polyolefin substrates. Furthermore, when a chlorinated polyolefin and a solid resole phenolic resin are used in combination, there is excellent adhesion between a polysulfide and a solid polyolefin substrate such that there is 100% cohesive failure. Furthermore, this combination also provides excellent adhesion to polyamides and polyvinyl chlorides, although only the chlorinated polyolefin is needed for improved adhesion to polyamides and polyvinyl chlorides, and only the resole phenolic resin is needed for excellent adhesion such that there is 100% cohesive failure to polyamides and polyvinyl chlorides.

Whether each of these adhesion promoters, i.e., the solid resole phenolic resin and the chlorinated polyolefin, are used alone or in combination: (1) the solid resole phenolic resin is preferably present in the adhesion promoter compositions in an amount of about 5–75 wt-%, more preferably in an amount of about 10–70 wt-%, and most preferably in an amount of about 10–50 wt-%; and (2) the chlorinated polyolefin is preferably present in an amount of no greater than about 10 wt-%, more preferably in an amount of no greater than about 7 wt-%, and most preferably in an amount of no greater than about 4 wt-%. If used in combination, the weight ratio of solid resole phenolic resin to chlorinated polyolefin in the cured, i.e., dried composition, is preferably about 99:1, more preferably about 96:4, and most preferably about 75:25. The adhesion promoter compositions also contain one or more compatible polar organic solvents.

Phenolic Resin

Phenolic resins are any of several types of synthetic resins obtained by the condensation of phenol or substituted phenols with aldehydes such as formaldehyde, acetaldehyde, and furfural. Phenol-formaldehyde resins constitute the broadest class of phenolic resins. The adhesion promoter compositions of the present invention incorporate phenol-formaldehyde resins that are: solid at room temperature, i.e., about 20°–30° C.; compatible with polar organic solvents; and thermosetting, i.e., capable of solidifying irreversibly when heated. Suitable such resins are solid resole phenolic resins.

Resole phenolic resins are also referred to as one-step resins. They are alkaline catalyzed thermosetting phenol-formaldehyde resins consisting of primarily condensed phenol alcohols. They are prepared by the reaction of phenol with an excess of formaldehyde in the presence of a basic catalyst. They are typically soluble in one or more common solvents such as alcohols or ketones and are fusible at less than 150° C. On further heating, and without the use of a catalyst or additive, they convert to insoluble, infusible, crosslinked polymers.

Of the solid resole phenolic resins, the preferred ones are unmodified, i.e., they do not contain ingredients other than phenols and formaldehyde. A particularly preferred phenol-formaldehyde resole resin is available from Occidental Chemical Corporation, Durez Resins & Molding Materials (Tonawanda, N.Y.), under the trade designation DUREZ™ 175 phenolic resin. This is typically available in a crushed form. Another example of a useable solid resole phenolic resin is available from Oxychem (Dallas, Tex.), which is available under the trade designation Varcam 29219.

Polyolefins

Any of a variety of chlorinated polyolefins can be used in the present invention that have a molecular weight of about 5,000–200,000. Preferred polyolefins are those with a molecular weight of about 5,000–50,000.

Examples of suitable polyolefins include, but are not limited to, Hypalon™ CP-826, CP-827B, and CP-400 available from DuPont Chemicals (Wilmington, Del.); Superchlon™ 822 and 814 available from Nippon Paper (Japan); and Hardlan™ polyolefins available from Toyo (Japan). A preferred polyolefin is chlorinated polypropylene having grafted thereon maleic anthydride. Particularly preferred polyolefins are the chlorinated polyolefin available from Eastman Kodak Company, Eastman Chemical Company (Kingsport, Tenn.) under the trade designation "Eastman" chlorinated polyolefin, such as 343-1 and 343-3, which are available as mixtures of 50% solids in xylene.

Solvents

The solvents useful in the compositions of the present invention are polar organic solvents that are compatible with the solid resole phenolic resin and polyolefin used in the compositions. Preferably, the solvents are capable of solubilizing the solid resole phenolic resin at least to the extent that a minimum of about a 20 wt-% solution can be formed, and more preferably at least about a 30 wt-% solution. Examples of suitable solvents include, but are not limited to, ketones such as methyl ethyl ketone; alcohols such as isopropyl alcohol and butanol; hydrocarbons such as toluene; chlorinated solvents such as chloroethane and methylene chloride; and esters such as ethyl acetate and butyl acetate. For compositions containing a phenolic resin, the solvent is preferably methyl ethyl ketone and isopropanol. For compositions containing a phenolic resin and a chlorinated polyolefin, the solvent is preferably methyl ethyl ketone and xylene.

Additives

The adhesion promoter compositions of the present invention can also include other optional components, herein referred to as additives. Suitable additives are compatible with the other components of the composition. That is, additives that can be used in the compositions of the present invention do not interfere with the reactivity or activity of the other components in a manner that detrimentally effects the desired characteristics of the adhesion promoter. These additives include, for example, uv stabilizers, fillers, antioxidants, dyes (liquid or powder), etc. Each additive is used in an amount effective to produce a desired effect without detrimentally affecting the desired characteristics of the adhesion promoter. For example, a dye typically is used in an amount of about 0.05–1.0 wt-%.

Preparation of Adhesion Promoter Composition and Products

The adhesion promoter compositions of the present invention are typically prepared by combining the individual components in a compatible organic solvent, i.e., an organic solvent in which the components can be uniformly dispersed, preferably dissolved. The composition is then mixed, preferably in a slow speed, high torque mixer until the components are uniformly dispersed, preferably dissolved. The resultant dispersion, preferably solution, can be applied to at least one surface of a substrate or workpiece to be coated with polysulfide by any one of several conventional techniques. These include, for example, wiping, brushing, spraying, and dipping. The amount of solvent used can vary depending upon the desired composition viscosity, coating thickness, coating apparatus, and surface tension of the substrate. In general, a composition of about 25–75% solvent by weight has a satisfactory viscosity for use. The adhesion promoter composition is generally coated in an amount of about 90–180 g/m$^2$, preferably about 125–145 g/m$^2$, of the surface of the workpiece.

The coated workpiece is then subjected to a drying step to remove the solvent. Typically, this involves exposing the coated backing material to a temperature of less than about 100° F. (38° C.), preferably to a temperature of about 70°–77° F. (21°–25° C.). When exposed to such temperatures, the solvent is typically removed by evaporation in less than about 4 minutes, preferably in about 1–2 minutes. Generally, the higher the temperature used for drying, the shorter the exposure time required.

The workpiece having an adhesion composition coated thereon can be stored or used immediately without further processing. The resultant product can be used effectively in applications requiring any of a variety of temperatures, including room temperature. If the adhesion promoter composition is used in an application that requires the use of high temperatures, the composition of the present invention cures upon exposure to the elevated temperature. Advantageously, in many situations, the adhesion promoter that is cured at elevated temperatures has improved adhesive characteristics.

Subsequent to application and drying, i.e., curing, of the adhesion promoter, the coated workpiece is ready for application of the polysulfide polymer. Any of a variety of polysulfide polymers, i.e., polysulfide sealants, can be applied to the dried adhesion promoter layer. A typical polysulfide sealant is one that is prepared by oxidatively curing a thiol-terminated prepolymer with inorganic oxidants such as $MnO_2$. Such polysulfide sealants are described in *J. Appl. Polymer Sci.*, 41, 2837 (1990) and *Kirk Othmer Concise Encyclopedia of Chemical Technology*, 18, 814. The polysulfide sealant can be applied on the dried adhesion promoter layer by any one of several conventional techniques. The coated workpiece is then allowed to cure, typically overnight at room temperature, i.e., about 70°–77° F. (21°–25° C.). Additionally, however, elevated temperatures (e.g., 200°–220° F. (93°–104° C.)) may be used for short periods of time (i.e., 5–30 minutes) to improve adhesion of the polysulfide.

Applications

Although the adhesion promoter compositions of the present invention can be used in various applications, they are particularly useful in petrol refining industries as a surface coating for containment barriers as well as an adhesion promoter for nylon-coated steel used as piping in refineries. They are also useful as a gas tank sealant for polypropylene or polyethylene tanks.

Figure 2:
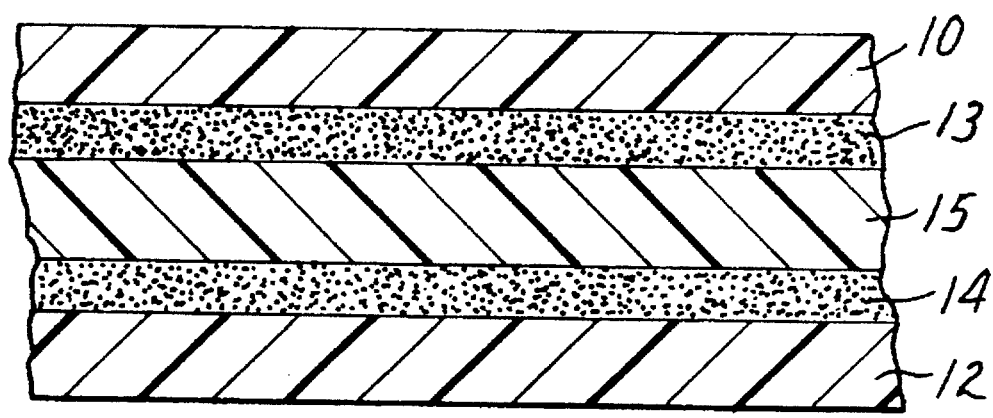
FIG. 2 is a cross-sectional view of an alternative embodiment of an article having two thermoplastic polymeric substrates, each with a layer of an adhesion promoter composition thereon, held together by a polysulfide polymer.

Two particular embodiments of the invention are shown in the figures. FIG. 1 is a cross-sectional view of an embodiment of a thermoplastic substrate, e.g., a coating of polyamide (1) on a steel workpiece (2), having coated thereon a layer of an adhesion promoter (3) and a layer of a polysulfide polymer, e.g., a polysulfide sealant (4). FIG. 2 is a cross-sectional view of an alternative embodiment of an article having two thermoplastic polymeric substrates, e.g., two nylon substrates (10) and (12), each with a layer of an adhesion promoter (13) and (14) coated thereon, held together by a polysulfide polymer (15). In this latter embodiment, essentially the polysulfide is used to bond two pieces of nylon together. Thus, included within the scope of the present invention are polysulfide-coated articles comprising a thermoplastic substrate on which is coated a layer of an adhesion promoter and a layer of a polysulfide polymer. The adhesion promoter is a solid resole phenolic resin, a polyolefin, or a mixture thereof.

The following examples are offered to further illustrate the various specific and preferred embodiments and techniques. It should be understood, however, that many variations and modifications may be made while remaining within the scope of the present invention.

EXPERIMENTAL EXAMPLES

Example 1

Resole Phenolic Resin in MEK on Polyamide

An adhesion promoter composition was prepared by dissolving sufficient (100 g) DUREZ 175 phenolic resin (obtained from Occidental Chemical Corporation) in 100 g methyl ethyl ketone such that the final composition contained 50 wt-% solids. This was mixed for 48 hours at room temperature in a sealed aluminum can on electric driven rolls. A thin layer of this composition was wiped onto a polyamide test substrate (nylon-coated steel) using a Kimwipe tissue. The solvent was allowed to evaporate for about 2 minutes. About 10 minutes after application of the adhesion promoter, a polysulfide sealant available from H. B. Fuller Company under the tradename FR-1082 A/B was applied to the substrate having the adhesion promoter coated thereon. At least 5 inches (12.7 cm) of one side of the workpiece was coated with about ⅛ inch (0.3 cm) of the polysulfide.

A strip of cotton duct cloth (Type II of CCC-C-419 available from Independent Awning and Canvas, Dayton, Ohio) was impregnated with this same polysulfide sealant and worked in well such that 5 inches (12.7 cm) on one end of the strip was covered on both sides. The sealant-impregnated end of the fabric was applied to the substrate having the adhesion promoter and polysulfide sealant coated thereon such that no air bubbles were trapped beneath the fabric. Additional polysulfide sealant was applied to the top of the cloth to form a ¹⁄₃₂ inch (7.9 mm) coating and complete a peel specimen. The peel specimen was cured overnight at 77° F. (25° C.) and 50% relative humidity before testing.

A razor blade was used to cut into the sealant down to the substrate to promote adhesive failure of the sealant to the substrate. A one-inch (2.5 cm) width strip of the cloth was cut and pulled back at an angle of 180° to the metal panel in a tensile testing machine using a jaw separation rate of 2 inches (5.1 cm) per minute to determine adhesion. The peel specimen failed cohesively to the substrate, pulling approximately 50 pounds force (1 bf) per inch. By "failing cohesively to the substrate" it is meant that the sealant fails internally before the bond between the substrate and the sealant is affected. This is referred to as "100% cohesive failure." Thus, there was excellent adhesion between the substrate and the polysulfide.

The same procedure was carried out without the resole phenolic resin. The sealant pulled off the test specimen easily, with a peel strength of 0–1.5 1 bf in a 180° peel test.

Example 2

Resole Phenolic Resin in IPA on Polyamide

Using the same procedure outlined in Example 1, an adhesion promoter composition containing 80 g DUREZ 175 phenolic resin and 200 g isopropanol such that the final composition contained 40 wt-% solids was tested. The peel specimen failed cohesively to the substrate, pulling approximately 50 pounds force (1 bf) per inch.

Example 3

Resole Phenolic Resin in MEK on Polyvinyl Chloride

Using a similar procedure to that outlined in Example 1 and a polyvinyl chloride specimen primed with an adhesion promoter composition containing 100 g DUREZ 175 phenolic resin and 100 g MEK such that the final composition contained 50.0 wt-% solids was tested. The peel specimen failed cohesively to the substrate.

Example 4

Resole Phenolic Resin and Chlorinated Polyolefin on Polypropylene

An adhesion promoter composition was prepared by: (a) dispersing 10 g of "Eastman" chlorinated polyolefin CP-343-1 (50% solids in xylene available film Eastman Chemical Company, Kingsport, Tenn.) in 90 g methyl ethyl ketone with stirring for two minutes using a metal spatula at room temperature; (b) preparing a composition containing DUREZ 175 phenolic resin in methyl ethyl ketone according to the procedure outlined in Example 1; and (c) combining a 3 gram sample of the DUREZ 175 composition with a 10 gram sample of the CP-343-1 composition with stirring for two minutes using a metal spatula at room temperature to form a mixture containing 7.7 wt-% chlorinated polyolefin in xylene, 11.5 wt-% phenolic resin, and 80.8 wt-% methyl ethyl ketone.

This mixture was tested by coating a thin layer of this composition onto a polypropylene test substrate using a Kimwipe tissue. The solvent was allowed to evaporate for about 2 minutes. About 10 minutes after application of the adhesion promoter, a polysulfide sealant available from H. B. Fuller Company under the tradename FR-1082 A/B was applied to the substrate having the adhesion promoter coated thereon. At least 3 inches of one side of the workpiece was coated with about ⅛ inch (0.3 cm) of the polysulfide. The peel specimen was cured overnight at 77° F. (25° C.) and 50% relative humidity and for 15 minutes at 210° F. (99° C.). The specimen was cooled for 4 hours at room temperature. A razor blade was cut into the sealant down to the substrate. The polysulfide sealant could not be peeled away from the substrate. Thus, the sealant adheres to polypropylene with 100% cohesive failure.

Example 5

Resole Phenolic Resin and Chlorinated Polyolefin on Polypropylene

An adhesion promoter composition was prepared as described in Example 4, but 10 grams of the DUREZ-175 composition and 3 grams of the CP-343-1 composition were combined. This composition was tested according to the procedure outlined in Example 4. The peel specimen failed 100% cohesively to the substrate.

Example 6

Resole Phenolic Resin and Chlorinated Polyolefin on Polyamide

An adhesion promoter composition was prepared as described in Example 4. This composition was tested according to the procedure outlined in Example 4, except a polyamide test substrate was used. The peel specimen failed 100% cohesively to the substrate.

Example 7

Polyolefin Adhesion Promoter on Polyamide and on Polypropylene

A thin layer of "Eastman" chlorinated polyolefin CP-343—1 was coated on a polyamide test substrate as in Example 1 and on a polypropylene test substrate using a Kimwipe tissue. The solvent was allowed to evaporate for about 2 minutes. A polysulfide sealant available from H. B. Fuller Company under the tradename FR-1082 A/B was applied to each substrate having the adhesion promoter coated thereon. These peel specimens were cured overnight at room temperature and for 10 minutes at 210° F. (99° C.). The specimens were cooled for 4 hours at room temperature. A razor blade was cut into the sealant of each specimen down to the substrate. The polysulfide sealant adhered better to each substrate with this adhesion promoter than if no adhesion promoter was used; however, for both the polyamide and the polypropylene substrates the sealant failed 100% adhesively to the substrate. That is, the bond between the substrate and the sealant failed.

The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The disclosures of all patents and documents are incorporated herein by reference.

What is claimed is:

1. A polysulfide-coated substrate comprising:
   (a) a thermoplastic substrate;
   (b) an adhesion promoter layer coated on at least one surface of the thermoplastic substrate; and
   (c) a polysulfide polymer layer coated on the adhesion promoter layer; wherein the adhesion promoter comprises a cured solid resole phenolic resin.

2. The polysulfide-coated substrate of claim 1 wherein the adhesion promoter further includes a chlorinated polyolefin.

3. The polysulfide-coated substrate of claim 2 wherein the thermoplastic substrate has a surface tension of less than 35 dynes/cm$^2$.

4. The polysulfide-coated substrate of claim 3 wherein the thermoplastic substrate is polypropylene.

5. The polysulfide-coated substrate of claim 1 wherein the thermoplastic substrate has a surface tension of at least 35 dynes/cm$^2$.

6. The polysulfide-coated substrate of claim 5 wherein the thermoplastic substrate is polyamide or polyvinyl chloride.

7. A method of promoting adhesion of a polysulfide sealant to a thermoplastic substrate; said method comprising:
   (a) applying an adhesion promoter composition to at least one surface of the thermoplastic substrate;
   (b) drying the adhesion promoter composition to form a cured layer of the adhesion promoter; and
   (c) applying a polysulfide polymer to the thermoplastic substrate having the adhesion promoter coated thereon; wherein the adhesion promoter composition comprises:
      (i) a solid phenolic resin; and
      (ii) a compatible polar organic solvent.

8. The method of claim 7 wherein the adhesion promoter composition further comprises a chlorinated polyolefin.

9. The method of claim 8 wherein the thermoplastic substrate has a surface tension of less than 35 dynes/cm$^2$.

10. The method of claim 9 wherein the thermoplastic substrate is polypropylene.

11. The method of claim 7 wherein the thermoplastic substrate has a surface tension of at least 35 dynes/cm$^2$.

12. The method of claim 11 wherein the thermoplastic substrate is nylon.

13. The method of claim 11 wherein the thermoplastic substrate is polyvinyl chloride.

14. An adhesion promoter composition for improving the adhesion of a polysulfide to a thermoplastic substrate comprising:

(a) a solid resole phenolic resin;
   (b) a chlorinated polyolefin; and
   (c) a compatible polar solvent; wherein the solid resole phenolic resin and chlorinated polyolefin are present in the composition in amounts such that the ratio of solid resole phenolic resin to chlorinated polyolefin in the dried composition is at least about 3:1.

15. The adhesion promoter composition of claim 14 wherein the solid phenolic resin is present in an amount of about 5–75 wt-%, based on the total weight of the composition.

16. The adhesion promoter composition of claim 14 wherein the chlorinated polyolefin is present in an amount of up to about 10 wt-%, based on the total weight of the composition.

17. The adhesion promoter composition of claim 14 wherein the solid resole phenolic resin is unmodified.

18. The adhesion promoter composition of claim 14 wherein the solid phenolic resin is present in an amount of about 10–70 wt-% and the chlorinated polyolefin is present in an amount of up to about 7 wt-%, based on the total weight of the composition.

19. The adhesion promoter composition of claim 14 wherein the solid resole phenolic resin is present in an amount of about 10–50 wt-% and the chlorinated polyolefin is present in an amount of up to about 4 wt-%, based on the total weight of the composition.

20. The adhesion promoter composition of claim 14 wherein the polar solvent is an alcohol or a ketone.

* * * * *